US008019143B2

(12) United States Patent
Kanda

(10) Patent No.: US 8,019,143 B2
(45) Date of Patent: Sep. 13, 2011

(54) IMAGE PROCESSING APPARATUS AND COMPUTER PROGRAM PRODUCT

(75) Inventor: Yamato Kanda, Tokyo (JP)

(73) Assignee: Olympus Corporation, Tokyo (JP)

( * ) Notice: Subject to any disclaimer, the term of this patent is extended or adjusted under 35 U.S.C. 154(b) by 943 days.

(21) Appl. No.: 11/945,760

(22) Filed: Nov. 27, 2007

(65) Prior Publication Data
US 2008/0260206 A1 Oct. 23, 2008

Related U.S. Application Data

(63) Continuation of application No. PCT/JP2006/308887, filed on Apr. 27, 2006.

(30) Foreign Application Priority Data

May 30, 2005 (JP) ................................. 2005-158038

(51) Int. Cl.
G06K 9/00 (2006.01)
(52) U.S. Cl. ........................................ 382/133; 382/103
(58) Field of Classification Search .................. 382/103, 382/128, 133, 159, 170, 224; 348/135, 137, 348/169; 377/10–12
See application file for complete search history.

(56) References Cited

U.S. PATENT DOCUMENTS

| 5,487,112 | A | * | 1/1996 | Zygourakis et al. .......... 382/133 |
| 6,157,744 | A | | 12/2000 | Nagasaka et al. |
| 6,445,409 | B1 | * | 9/2002 | Ito et al. ........................ 348/155 |
| 6,785,411 | B1 | | 8/2004 | Kitajima et al. |
| 2002/0119441 | A1 | * | 8/2002 | Elias ................................. 435/4 |
| 2003/0048849 | A1 | | 3/2003 | Tomita, Jr. et al. |
| 2004/0128077 | A1 | * | 7/2004 | Koebler et al. ................. 702/19 |

FOREIGN PATENT DOCUMENTS

| JP | 63-025783 | 2/1988 |
| JP | 5-37853 | 2/1993 |
| JP | HEI 5-46771 A | 2/1993 |
| JP | 8-221548 | 8/1996 |
| JP | 8-227462 | 9/1996 |
| JP | HEI 9-161071 A | 6/1997 |
| JP | HEI 9-168153 A | 6/1997 |
| JP | 9-297850 | 11/1997 |
| JP | 10-304348 | 11/1998 |
| JP | 11-32325 | 2/1999 |
| JP | 2001-52173 | 2/2001 |

(Continued)

OTHER PUBLICATIONS

Japanese Office Action dated Aug. 21, 2009.

(Continued)

Primary Examiner — Jason M Repko
Assistant Examiner — Shervin Nakhjavan
(74) Attorney, Agent, or Firm — Scully, Scott, Murphy & Presser, P.C.

(57) ABSTRACT

An image processing apparatus includes a feature-quantity calculating unit that calculates feature quantities of target regions each indicating a tracking object in respective target images, the target images being obtained by capturing the tracking object at a plurality of time points; a provisional-tracking processing unit that performs provisional tracking of the target region by associating the target regions of the target images with each other using the calculated feature quantities; and a final-tracking processing unit that acquires a final tracking result of the target region based on a result of the provisional tracking.

18 Claims, 20 Drawing Sheets

FOREIGN PATENT DOCUMENTS

| | | |
|---|---|---|
| JP | 2002-63577 | 2/2002 |
| JP | 2002-99918 | 4/2002 |
| JP | 2002-342762 | 11/2002 |
| JP | 2003-67754 | 3/2003 |
| JP | 2003-250382 | 9/2003 |
| JP | 2004-0534315 | 11/2004 |
| WO | WO 03/003309 A1 | 1/2003 |
| WO | WO 2005/003812 A1 | 1/2005 |

OTHER PUBLICATIONS

Japanese Office Action dated Feb. 2, 2010 with English Translation.
Japanese Office Action dated Nov. 4, 2009 with English translation.
Mubarak, S. et al., "A Noniterative Greedy Algorithm for Multiframe Point Correspondence," IEEE Transactions on Patiern Analysis and Machine Intelligence, IEEE Service Center, Los Alamitos, CA, US, vol. 27, No. 1, Jan. 1, 2005, pp. 51-65, XP011122155, ISSN: 0162-8828,001: DOI:10.1109fTPAMI.2005.1.
Veenman, C. et al. "Resolving Motion Correspondence For Densely Moving Points", IEEE Transactions on Patiern Analysis and Machine Intelligence, IEEE Service Center, Los Alamitos, CA, US, vol. 23, No. 1, Jan. 1, 2001, pp. 54-72, XP001008996, ISSN: 0162-8828, 001: 001:I0.1109/34.899946.
Cheng C. et al., "A Two-stage Hybrid Approach to the Correspondence Problem Via Forward-searching and Backward-correcting", Proceedings of the International Conference on Patiern Recognition, Atlantic City, Jun. 16-21,1990, Conference A : Computer Vision and Conference B : Patiern Recognition Systems and Applications; Proceedings of the International Conference on Pat, vol. i, Jun. 16, 1990, pp. 173-179, XP010020247, D01: DOI:1 0.11 09/ICPR.1990. 118084 ISBN: 978-0/8186-2062-1.
Sethi, I. et al. "Finding Trajectories of Feature Points in a Monocular Image Sequence", IEEE Transactions on Patiern Analysis and Machine Intelligence, IEEE Service Center, Los Alamitos, CA, US, vol. 30, No. 1, Jan. 1, 1987, pp. 56-73, XPO11242988, ISSN: 0162-8828.
Pulford, G., "Taxonomy of Multiple Target Tracking Methods—Target tracking: algorithms and applications", IEE Proceedings: Radar, Sonar & Navigation, Institution of Electrical Engineers, GB, vo 1. 152, No. 5, Oct. 7, 2005, pp. 291-304, XP006024977, ISSN: 1350-2395, 001: D0I:10.10491IP-RSN:20045064.
Extended Supplementary European Search Report dated Apr. 19, 2011.

* cited by examiner

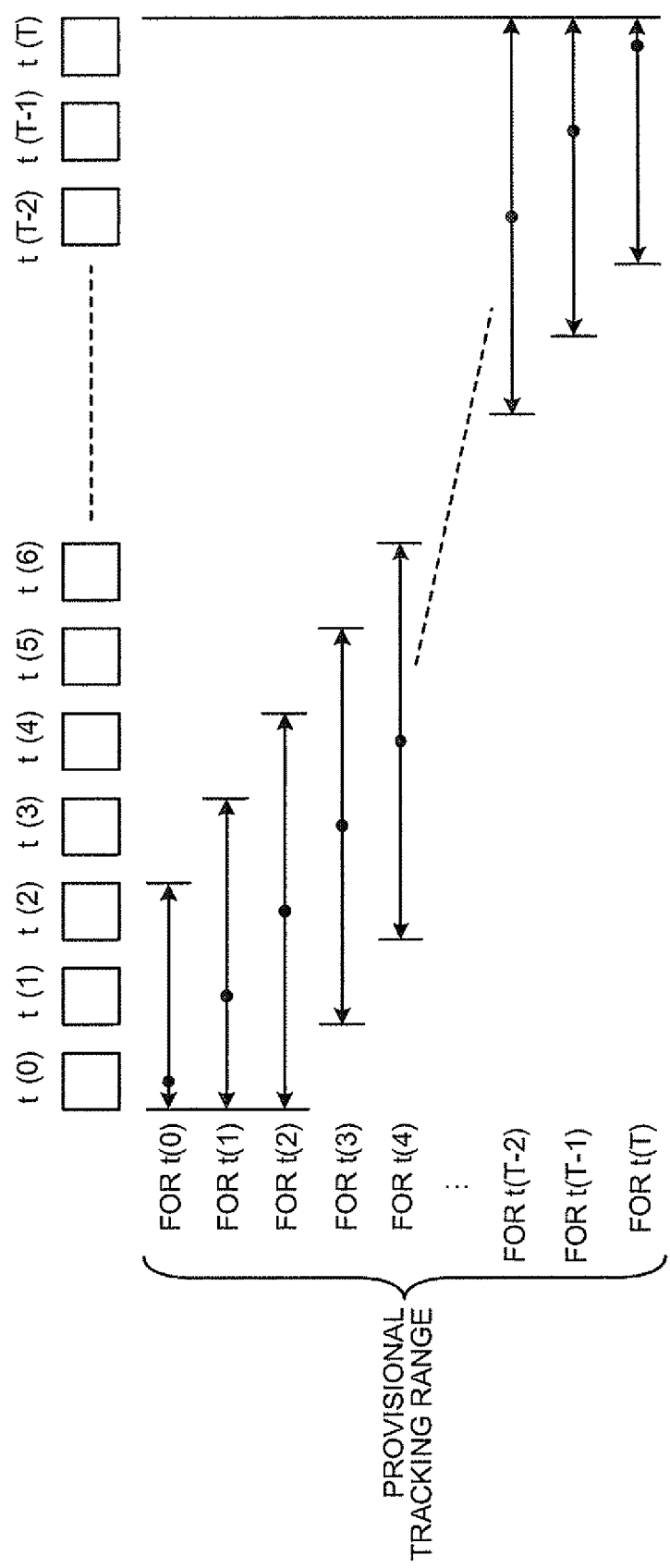

FIG.7

| ORIGIN IMAGE \ TIME | | t(0) | t(1) | t(2) |
|---|---|---|---|---|
| t(0) ORIGIN | REGION No.1 | ID1 | | |
| | REGION No.2 | ID2 | | |
| | REGION No.3 | - | | |
| | REGION No.4 | - | | |
| t(1) ORIGIN | REGION No.1 | | ID1 | |
| | REGION No.2 | | ID2 | |
| | REGION No.3 | | - | |
| | REGION No.4 | | - | |
| t(2) ORIGIN | REGION No.1 | | | ID1 |
| | REGION No.2 | | | ID2 |
| | REGION No.3 | | | ID3 |
| | REGION No.4 | | | ID4 |

FIG.8

| TIME | REGION No. | TIME | REGION No. | CORRESPONDENCE INDEX VALUE |
|---|---|---|---|---|
| t(1) | 1 | t(2) | 1 | 0.2087 |
| t(1) | 1 | t(2) | 2 | 0.9066 |
| t(1) | 2 | t(2) | 3 | 0.5647 |
| t(1) | 2 | t(2) | 4 | 0.5296 |

FIG.9

| TIME<br>REGION No. | t(0) | t(1) | t(2) |
|---|---|---|---|
| REGION No.1 |  | ID2 | ID1 |
| REGION No.2 |  | ID3 | ID2 |
| REGION No.3 |  | - | ID3 |
| REGION No.4 |  | - | ID4 |

FIG.10

| TIME | REGION No. | TIME | REGION No. | CORRESPON-DENCE INDEX VALUE |
|---|---|---|---|---|
| t(1) | 1 | t(0) | 1 | 0.8032 |
| t(1) | 1 | t(0) | 2 | 0.2481 |
| t(1) | 2 | t(0) | 1 | 0.304 |

| TIME / REGION No. | t(0) | t(1) | t(2) |
|---|---|---|---|
| REGION No.1 | ID1 | ID1 | |
| REGION No.2 | ID2 | ID1 | |
| REGION No.3 | - | - | |
| REGION No.4 | - | - | |

FIG.13

| ORIGIN IMAGE | TIME | t(0) | t(1) | t(2) |
|---|---|---|---|---|
| t(0) ORIGIN | REGION No.1 | ID1 | ID1 | ID1 |
| | REGION No.2 | ID2 | ID1 | ID1 |
| | REGION No.3 | - | - | ID1 |
| | REGION No.4 | - | - | ID1 |
| t(1) ORIGIN | REGION No.1 | ID1 | ID1 | ID1 |
| | REGION No.2 | ID1 | ID2 | ID1 |
| | REGION No.3 | - | - | ID2 |
| | REGION No.4 | - | - | ID2 |
| t(2) ORIGIN | REGION No.1 | ID2 | ID2 | ID1 |
| | REGION No.2 | ID2 | ID3 | ID2 |
| | REGION No.3 | - | - | ID3 |
| | REGION No.4 | - | - | ID4 |

FIG.14

| REGION OF INTEREST | TIME | t(0) |
|---|---|---|
| REGION No. 1 AT t(0) | REGION No.1 | 1 |
| | REGION No.2 | 2 |
| REGION No. 2 AT t(0) | REGION No.1 | 2 |
| | REGION No.2 | 1 |

FIG.16

| ORIGIN IMAGE | TIME | t(0) | t(1) | t(2) | t(3) |
|---|---|---|---|---|---|
| t(0) ORIGIN | REGION No.1 | ID1 | ID1 | ID1 | ID1 |
| | REGION No.2 | ID2 | ID1 | ID1 | ID1 |
| | REGION No.3 | - | - | ID1 | ID1 |
| | REGION No.4 | - | - | ID1 | - |
| t(1) ORIGIN | REGION No.1 | ID1 | ID1 | ID1 | ID1 |
| | REGION No.2 | ID1 | ID2 | ID1 | ID1 |
| | REGION No.3 | - | - | ID2 | ID2 |
| | REGION No.4 | - | - | ID2 | - |
| t(2) ORIGIN | REGION No.1 | ID2 | ID2 | ID1 | ID1 |
| | REGION No.2 | ID2 | ID3 | ID2 | ID2 |
| | REGION No.3 | - | - | ID3 | ID3 |
| | REGION No.4 | - | - | ID4 | - |
| t(3) ORIGIN | REGION No.1 | ID2 | ID2 | ID1 | ID1 |
| | REGION No.2 | ID2 | ID3 | ID2 | ID2 |
| | REGION No.3 | - | - | ID3 | ID3 |
| | REGION No.4 | - | - | ID3 | - |

FIG.17

| REGION OF INTEREST | TIME | t(0) | t(1) |
|---|---|---|---|
| REGION No. 1 AT t(1) | REGION No.1 | 4 | 0 |
| | REGION No.2 | 3 | 1 |
| REGION No. 2 AT t(1) | REGION No.1 | 1 | 1 |
| | REGION No.2 | 0 | 3 |

| TIME<br>REGION No. | t(0) | t(1) | t(2) | t(3) | |
|---|---|---|---|---|---|
| 1 | F_ID1 | F_ID1 | | | |
| 2 | F_ID1 | F_ID2 | | | |
| 3 | - | - | | | |
| 4 | - | - | | | |

FIG.20

| ORIGIN IMAGE \ TIME | | t(0) | t(1) | t(2) | t(3) | t(4) |
|---|---|---|---|---|---|---|
| t(0) ORIGIN | REGION No.1 | ID1 | ID1 | ID1 | ID1 | ID1 |
| | REGION No.2 | ID2 | ID1 | ID1 | ID1 | - |
| | REGION No.3 | - | - | ID1 | ID1 | - |
| | REGION No.4 | - | - | ID1 | - | - |
| t(1) ORIGIN | REGION No.1 | ID1 | ID1 | ID1 | ID1 | ID1 |
| | REGION No.2 | ID1 | ID2 | ID1 | ID1 | - |
| | REGION No.3 | - | - | ID2 | ID2 | - |
| | REGION No.4 | - | - | ID2 | - | - |
| t(2) ORIGIN | REGION No.1 | ID2 | ID2 | ID1 | ID1 | ID2 |
| | REGION No.2 | ID2 | ID3 | ID2 | ID2 | - |
| | REGION No.3 | - | - | ID3 | ID3 | - |
| | REGION No.4 | - | - | ID4 | - | - |
| t(3) ORIGIN | REGION No.1 | ID2 | ID2 | ID1 | ID1 | ID2 |
| | REGION No.2 | ID2 | ID3 | ID2 | ID2 | - |
| | REGION No.3 | - | - | ID3 | ID3 | - |
| | REGION No.4 | - | - | ID3 | - | - |
| t(4) ORIGIN | REGION No.1 | ID1 | ID1 | ID1 | ID1 | ID1 |
| | REGION No.2 | ID1 | ID2 | ID1 | ID1 | - |
| | REGION No.3 | - | - | ID2 | ID2 | - |
| | REGION No.4 | - | - | ID2 | - | - |

FIG.21

| REGION OF INTEREST / TIME | | t(0) | t(1) | t(2) |
|---|---|---|---|---|
| REGION No. 1 AT t(2) | REGION No.1 | 3 | 3 | 2 |
| | REGION No.2 | 2 | 1 | 3 |
| | REGION No.3 | - | - | 1 |
| | REGION No.4 | - | - | 1 |
| REGION No. 2 AT t(2) | REGION No.1 | 5 | 5 | 3 |
| | REGION No.2 | 4 | 1 | 0 |
| | REGION No.3 | - | - | 1 |
| | REGION No.4 | - | - | 1 |
| REGION No. 3 AT t(2) | REGION No.1 | 1 | 1 | 1 |
| | REGION No.2 | 0 | 5 | 1 |
| | REGION No.3 | - | - | 0 |
| | REGION No.4 | - | - | 4 |
| REGION No. 4 AT t(2) | REGION No.1 | 1 | 1 | 1 |
| | REGION No.2 | 0 | 4 | 1 |
| | REGION No.3 | - | - | 4 |
| | REGION No.4 | - | - | 1 |

FIG.22

| TIME / REGION No. | t(0) | t(1) | t(2) | t(3) | |
|---|---|---|---|---|---|
| 1 | F_ID1 | F_ID1 | F_ID1 | | |
| 2 | F_ID1 | F_ID2 | F_ID1 | | |
| 3 | - | - | F_ID2 | | |
| 4 | - | - | F_ID2 | | |

FIG.24

| ORIGIN IMAGE \ TIME | | t(2) | t(3) | t(4) | t(5) | t(6) |
|---|---|---|---|---|---|---|
| t(2) ORIGIN | REGION No.1 | ID1 | ID1 | ID2 | ID2 | ID2 |
| | REGION No.2 | ID2 | ID2 | - | ID3 | ID2 |
| | REGION No.3 | ID3 | ID3 | - | - | ID3 |
| | REGION No.4 | ID4 | - | - | - | - |
| t(3) ORIGIN | REGION No.1 | ID1 | ID1 | ID2 | ID2 | ID2 |
| | REGION No.2 | ID2 | ID2 | - | ID3 | ID2 |
| | REGION No.3 | ID3 | ID3 | - | - | ID3 |
| | REGION No.4 | ID3 | - | - | - | - |
| t(4) ORIGIN | REGION No.1 | ID1 | ID1 | ID1 | ID1 | ID1 |
| | REGION No.2 | ID1 | ID1 | - | ID3 | ID1 |
| | REGION No.3 | ID2 | ID2 | - | - | ID3 |
| | REGION No.4 | ID2 | - | - | - | - |
| t(5) ORIGIN | REGION No.1 | ID1 | ID1 | ID1 | ID1 | ID1 |
| | REGION No.2 | ID1 | ID1 | - | ID2 | ID1 |
| | REGION No.3 | ID2 | ID2 | - | - | ID2 |
| | REGION No.4 | ID2 | - | - | - | - |
| t(6) ORIGIN | REGION No.1 | ID1 | ID1 | ID1 | ID1 | ID1 |
| | REGION No.2 | ID1 | ID1 | - | ID3 | ID2 |
| | REGION No.3 | ID3 | ID3 | - | - | ID3 |
| | REGION No.4 | ID3 | - | - | - | - |

FIG.26

| ORIGIN IMAGE \ TIME | | t(3) | t(4) | t(5) | t(6) | t(7) |
|---|---|---|---|---|---|---|
| t(3) ORIGIN | REGION No.1 | ID1 | ID2 | ID2 | ID2 | ID2 |
| | REGION No.2 | ID2 | - | ID3 | ID2 | ID3 |
| | REGION No.3 | ID3 | - | - | ID3 | ID3 |
| t(4) ORIGIN | REGION No.1 | ID1 | ID1 | ID1 | ID1 | ID1 |
| | REGION No.2 | ID1 | - | ID3 | ID1 | ID3 |
| | REGION No.3 | ID2 | - | - | ID3 | ID3 |
| t(5) ORIGIN | REGION No.1 | ID1 | ID1 | ID1 | ID1 | ID1 |
| | REGION No.2 | ID1 | - | ID2 | ID1 | ID2 |
| | REGION No.3 | ID2 | - | - | ID2 | ID2 |
| t(6) ORIGIN | REGION No.1 | ID1 | ID1 | ID1 | ID1 | ID1 |
| | REGION No.2 | ID1 | - | ID3 | ID2 | ID3 |
| | REGION No.3 | ID3 | - | - | ID3 | ID3 |
| t(7) ORIGIN | REGION No.1 | ID1 | ID1 | ID1 | ID1 | ID1 |
| | REGION No.2 | ID1 | - | ID2 | ID1 | ID2 |
| | REGION No.3 | ID2 | - | - | ID2 | ID3 |

FIG.27

| REGION No. \ TIME | t(0) | t(1) | t(2) | t(3) | t(4) | t(5) |
|---|---|---|---|---|---|---|
| 1 | F_ID1 | F_ID1 | F_ID1 | F_ID1 | F_ID1 | F_ID1 |
| 2 | F_ID1 | F_ID2 | F_ID1 | F_ID1 | - | F_ID2 |
| 3 | - | - | F_ID2 | F_ID2 | - | - |
| 4 | - | - | F_ID2 | - | - | - |

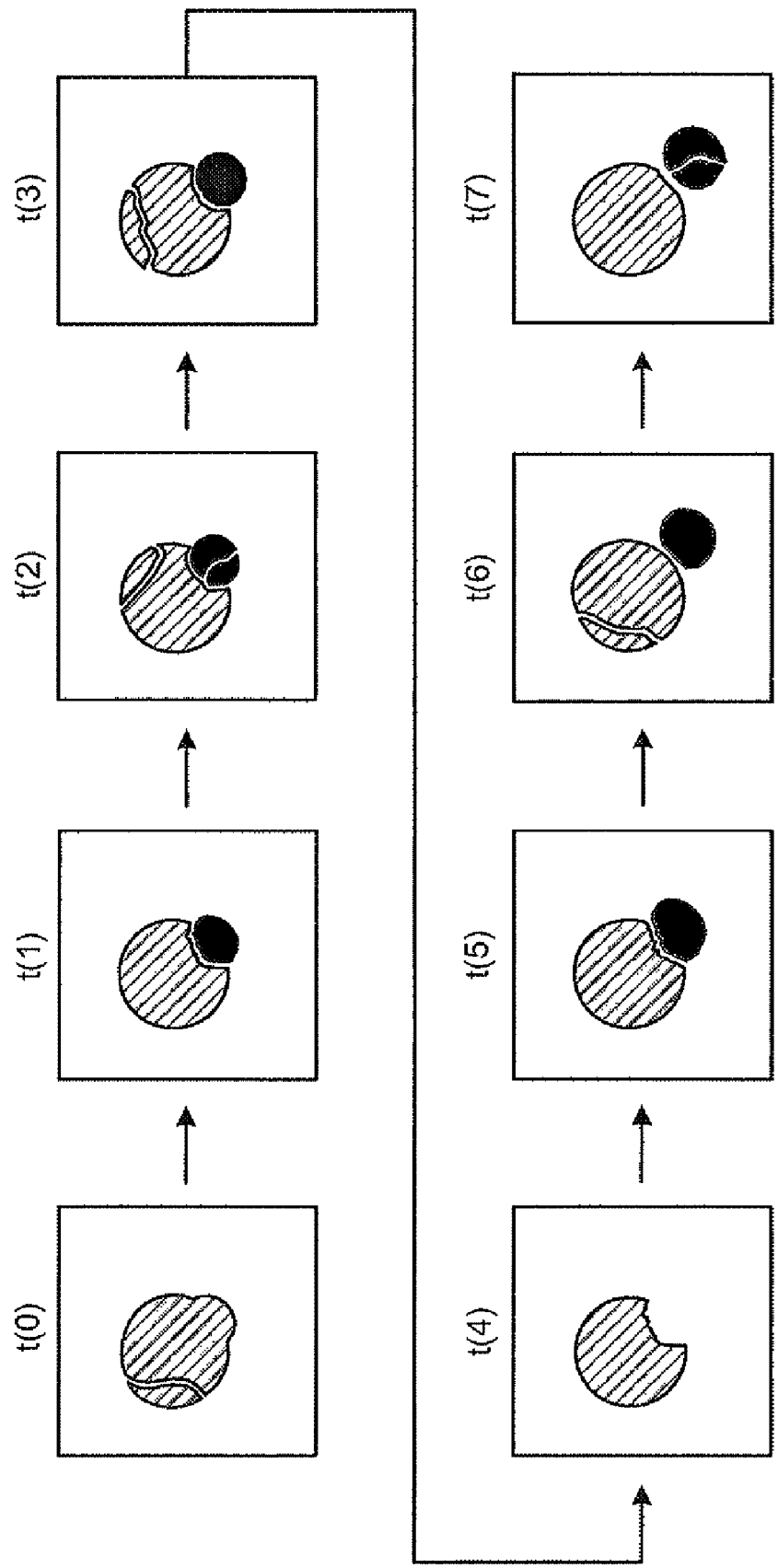

IMAGE PROCESSING APPARATUS AND COMPUTER PROGRAM PRODUCT

CROSS-REFERENCE TO RELATED APPLICATIONS

This application is a continuation of PCT international application Ser. No. PCT/JP2006/308887 filed Apr. 27, 2006 which designates the United States, incorporated herein by reference, and which claims the benefit of priority from Japanese Patent Application No. 2005-158038, filed May 30, 2005, incorporated herein by reference.

BACKGROUND OF THE INVENTION

1. Field of the Invention

The present invention relates to an image processing apparatus and a target-region tracking program to track a target region indicating a tracking object that is shown in an object image (hereinafter, appropriately described as "frame") at each time point obtained by capturing the tracking object at a plurality of time points in a time series.

2. Description of the Related Art

As a tracking processing of an object in images captured at a plurality of time points in a time series, Patent Document 1 discloses a method in which the object is tracked by associating target regions based on an overlapped area in serial frames of the target region indicating the tracking object, by categorizing a state of a target region as any one of appearance, single connection, coupling, disappearance, and separation based on a result of this association, and further by correcting, when categorized as coupling or separation, an error at the time of detection of the object. The error at the time of detection of the object is, for example, a phenomenon in which objects originally present in a plurality of pieces are detected as a single connected region due to overlap and the like, or in which an object originally being a single piece is detected as a plurality of separated regions due to some problems at the time of detection. Specific methods to correct such an error at the time of detection are following two methods.

In the first method, when regions indicating objects originally present in a plurality of pieces are connected into one region, it is determined as "connection", and a feature quantity of each region before connection in a previous frame is recorded. Moreover, when the region determined as "connection" is separated, regions are associated with each other such that coincidence in a feature quantity becomes highest in various combinations of each region after separation and each region before connection, to perform tracking.

In the second method, when a region indicating an object originally being a single piece is separated, it is determined as "division", and during the divided state, the tracking is performed assuming the center of gravity obtained by totaling respective regions being parts as a representative position. Moreover, when the regions determined as "division" are coupled, it is determined that two separated regions that are originally being a single piece has become detected as a single region.

To perform such correction, an object detection result with particularly high credibility is required in the serial frames. This is because even for separation, a different processing is performed for each of cases where a region that has been determined as connection is separated and where a region indicating an originally single object is separated, and also for coupling, a different processing is performed for each of cases where regions indicating originally plural objects are coupled and where regions that have been determined as division are coupled. In Japanese Patent Laid-Open Publication No. 2002-342762, to solve this problem, an initialization step is provided in which a result of detecting a region in a specific range in an image is used as a reference. This is because in Japanese Patent Laid-Open Publication No. 2002-342762, a tracking object is assumed to be a human, and for example, if an image range that shows around such a doorway that only one person can pass at a time is set as the specific range, it can be assumed that a result of object detection with high credibility can be obtained in that range.

However, in tracking a living cell, it is difficult to obtain an object detection result with high credibility in a specific range in an image. This is because in situations that a large number of dense cells are shot at a time, it is quite difficult to capture on a preferable condition independently for each of the cells and to detect a region showing the cell.

SUMMARY OF THE INVENTION

An image processing apparatus according to an aspect of the present invention includes a feature-quantity calculating unit that calculates feature quantities of target regions each indicating a tracking object in respective target images, the target images being obtained by capturing the tracking object at a plurality of time points; a provisional-tracking processing unit that performs provisional tracking of the target region by associating the target regions of the target images with each other using the calculated feature quantities; and a final-tracking processing unit that acquires a final tracking result of the target region based on a result of the provisional tracking.

A computer program product according to another aspect of the present invention has a computer readable medium including programmed instructions for tracking a target area indicating a tracking object present in target images obtained by capturing a tracking object at a plurality of time points in a time series, wherein the instructions, when executed by a computer, cause the computer to perform calculating feature quantities of target regions each indicating a tracking object in respective target images, the target images being obtained by capturing the tracking object at a plurality of time points; performing provisional tracking of the target region by associating the target regions of the target images with each other using the calculated feature quantities; and acquiring a final tracking result of the target region based on a result of the provisional tracking.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an explanatory diagram schematically showing a cell-image obtaining range for each time t(i) when n=2 is set as a time range for which provisional tracking is performed;

FIG. 7 is a schematic diagram showing an example of assignment of a provisional ID when each of the cell images at time t(0) to time t(2) shown in FIG. 6 in a provisional tracking range is an origin image when i=0;

FIG. 8 is an explanatory diagram showing an example of a result of calculation of a correspondence index value between a cell region in the image at time t(1) and a cell region in an origin image at time t(2) when the cell image at time t(2) is set as the origin image;

FIG. 9 is an explanatory diagram showing an example of propagation of the provisional ID to a cell region in the cell image at time t(1) when the cell image at time t(2) is set as the origin image;

FIG. 10 is an explanatory diagram showing an example of a calculation result of the correspondence index value between the cell region in the cell image at time t(1) and the cell region in an origin image at time t(0) when the cell image at time t(0) is set as the origin image;

FIG. 13 is an explanatory diagram showing the link relation between the cell regions shown in FIG. 12 in a form of a propagation table of the provisional ID;

FIG. 14 is an explanatory diagram showing a counting example of a result of the provisional tracking shown in FIG. 13;

FIG. 16 is an explanatory diagram showing the link relation between the cell regions shown in FIG. 15 in a form of a propagation table of the provisional ID;

FIG. 17 is an explanatory diagram showing a counting example of a result of the provisional tracking shown in FIG. 16;

FIG. 20 is an explanatory diagram showing the link relation between the cell regions shown in FIG. 19 in a form of a propagation table of the provisional ID;

FIG. 21 is an explanatory diagram showing a counting example of a result of the provisional tracking shown in FIG. 20;

FIG. 22 is an explanatory diagram showing an example of assignment of a final ID based on the counting example shown in FIG. 21;

FIG. 24 is an explanatory diagram showing the link relation between the cell regions shown in FIG. 23 in a form of a propagation table of the provisional ID;

FIG. 26 is an explanatory diagram showing the link relation between the cell regions shown in FIG. 25 in a form of a propagation table of the provisional ID;

FIG. 27 is an explanatory diagram showing an example of assignment of a final ID based on the counting example shown in FIG. 26; and FIG. 28 is a schematic diagram showing an example of a result of tracking a cell region in the cell images in a time series shown in FIG. 6.

DETAILED DESCRIPTION OF THE PREFERRED EMBODIMENTS

Exemplary embodiments according to the present invention are explained with reference to the accompanying drawings. In the embodiment described below, an image processing apparatus that tracks a cell region as a target region indicating a tracking object is explained as an example, however, the target region indicating a tracking object in the present invention is not limited to a cell region, and the present invention can be applied to an image processing apparatus that tracks a target region indicating another tracking object.

Figure 1:
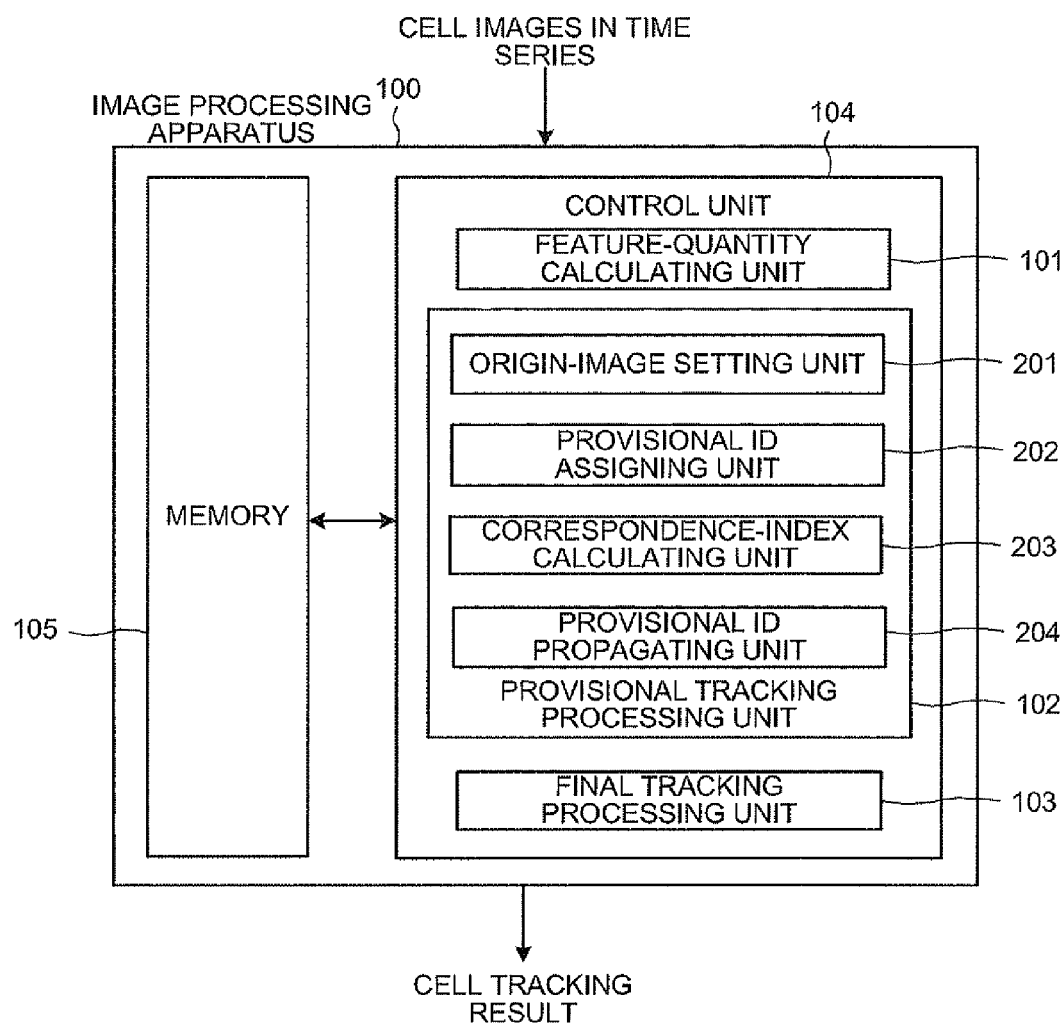
FIG. 1 is a schematic block diagram showing a configuration example of an image processing apparatus according to an embodiment of the present invention.

FIG. 1 is a schematic block diagram showing a configuration example of the image processing apparatus according to the present embodiment. An image processing apparatus 100 according to the present embodiment is constituted of a control unit 104 that is configured with a microcomputer and that includes a feature-quantity calculating unit 101 that calculates a feature quantity of a cell region that indicates a living cell in a cell image to be a subject at each time point that is obtained by capturing a living cell as a tracking object at a plurality of time points, a provisional tracking processing unit 102 that performs provisional tracking of the cell region by associating cell regions between cell images using the calculated feature quantity of a cell region, and a final tracking processing unit 103 that acquires a final tracking result of the cell region based on a result of the provisional tracking performed by the provisional tracking processing unit 102, and a memory 105 that stores input images and data used in each component.

The provisional tracking processing unit 102 includes an origin-image setting unit 201 that sets each of cell images at time points within a time range for which the provisional tracking is performed as an origin image to be an origin of the provisional tracking, a provisional ID assigning unit 202 that assigns a provisional ID to identify a cell region to each cell region in a cell image, a correspondence-index calculating unit 203 that calculates a correspondence index value indicating a degree of correspondence between the cell regions in cell images at different time points, and a provisional ID propagating unit 204 that associates the cell regions between cell images by sequentially propagating a provisional ID of a cell region having the highest correspondence index value to a cell region in a cell image at a time point earlier or later in a time series relative to the cell region in the origin image. A configuration for inputting cell images in a time series that are subjects of processing and a configuration for processing of an output result of cell tracking are not particularly limited in the present embodiment.

Figure 2:
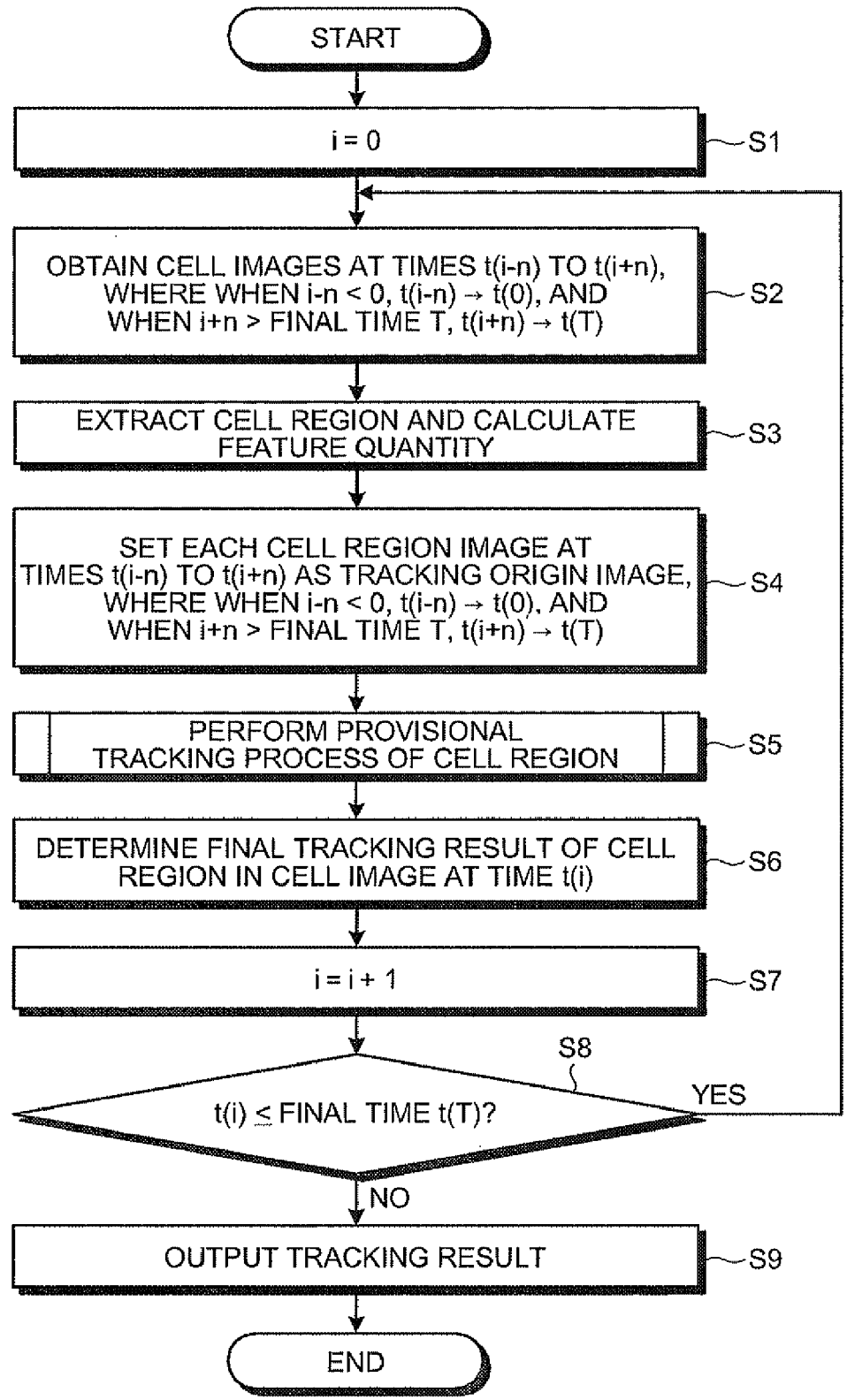
FIG. 2 is a schematic flowchart showing a flow of a process performed by a control unit of the image processing apparatus according to the embodiment.
Figure 3:
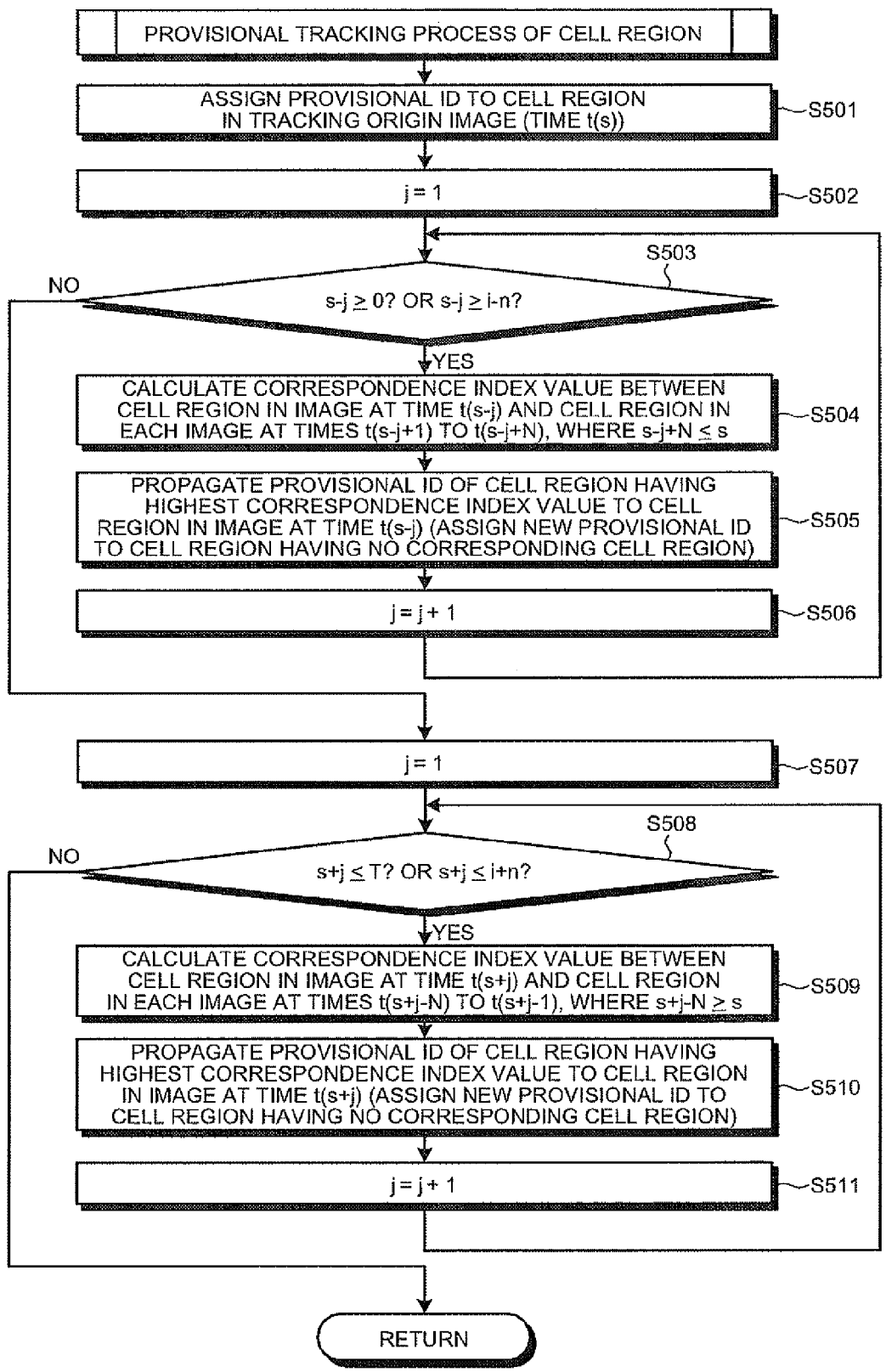
FIG. 3 is a schematic flowchart showing a process example of a subroutine being a provisional tracking process of a cell region performed by a provisional tracking processing unit.

FIG. 2 is a schematic flowchart showing a flow of a process performed by the control unit 104 of the image processing apparatus 100 according to the present embodiment, and FIG. 3 is a schematic flowchart showing a process example of a subroutine being a provisional tracking process of a cell region performed by the provisional tracking processing unit 102 at step S5. Herein, a flow of a processing when tracking of a cell region is performed using a plurality of cell images in a time series that are obtained by shooting a cell at a plurality of times (time points) from shooting start time t(0) to shooting end time t(T) is shown. The example of tracking process is explained below referring to the configuration example shown in FIG. 1.

First, the control unit 104 sets a code i indicating an order of a cell image in a time series to be focused to 0 (step S1), and cell images at times t(i−n) to t(i+n) are obtained (step S2). n is a value that determines a time range at the time of performing the provisional tracking described later, and in the present embodiment, explanation is given supposing n=2. When i=0, i−n=0−2=−2, and a cell image at time t(−2) is not present. Accordingly, when i−n<0, an image at the top in a time series obtained at step S2 is to be an image at time t(0). Moreover, also when it becomes i+n>T as a result of sequentially carrying forward the code i, no image is present, and therefore, an image at the end in a time series obtained at step S2 is to be an image at time t(T).

FIG. 4 is an explanatory diagram schematically showing a cell-image obtaining range for each time t(i) when n=2 is set as the time range for which the provisional tracking is performed. Black dots shown in FIG. 4 represent shooting time points of the cell image to be focused, which is indicated by the code i. As a result, when i=0 being the top in a time series, three cell images (frames) are obtained, when i=1 being the second in a time series, four cell images are obtained, when i=2 to T−2 being the middle in a time series, five cell images are obtained, when i=T−1, four cell images are obtained, and when i=T being the end in a time series, three cell images are obtained.

Figure 5A:
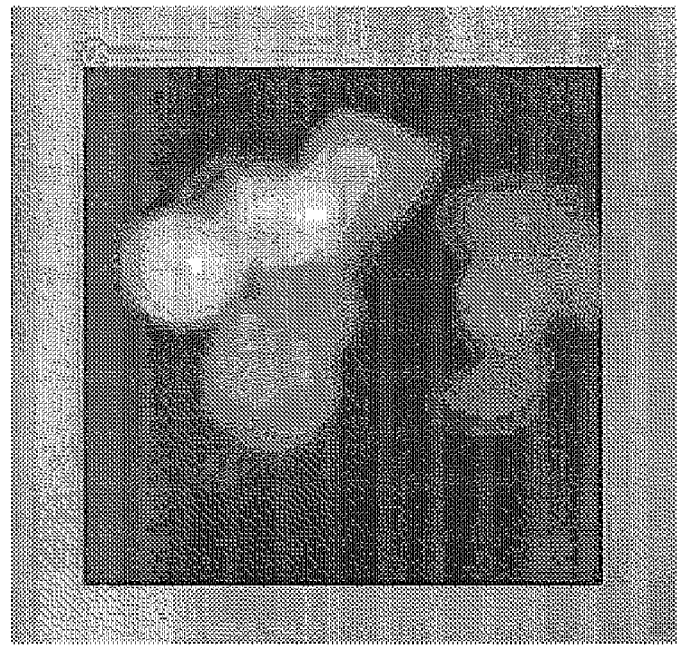
FIG. 5A is a view showing an example of a cell image to be a subject of a recognition process.
Figure 5B:
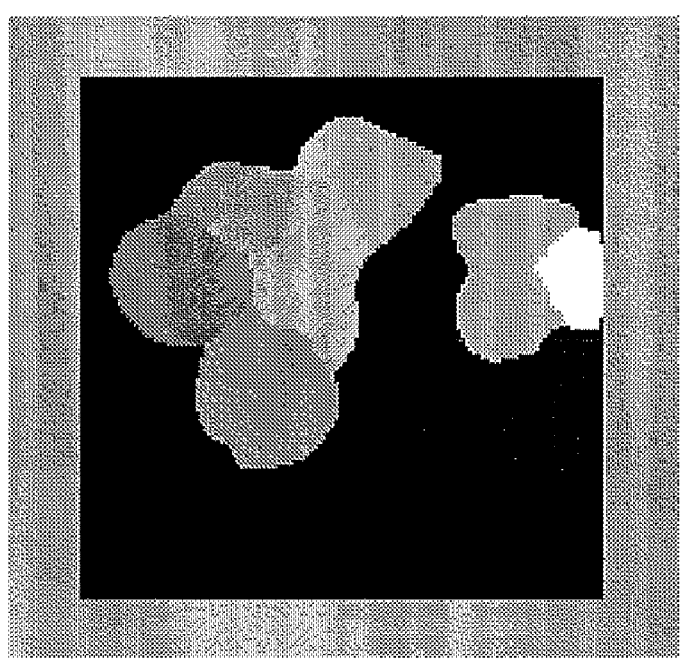
FIG. 5B is a view showing an example of a recognition image of a cell region that is labeled for each region.

Next, the feature-quantity calculating unit 101 recognizes a cell region in each of the obtained cell images and calculates a feature quantity of each cell region (step S3). For the recognition process for cell regions, for example, a proposal described in Japanese Patent Application No. 2005-24511 achieved by the present applicant can be used. Outline of the procedures are explained. First, a shading correction and an edge enhancement process are performed on a cell image. Subsequently, a background range is removed and a luminance gradient direction in each of remaining pixels is calculated. Next, a peak luminance pixel reached by each pixel along the luminance gradient direction is acquired, and a labeled region image is created in which each pixel reached an adjacent peak luminance pixel has the same pixel value. Furthermore, based on luminance information of a cell image around a boundary of each of labeled regions, the labeled regions are reintegrated to obtain a final cell region image. For example, such a recognition process is performed on a cell image shown in FIG. 5A, and a recognition image of cell regions that are labeled for each region as shown in FIG. 5B is obtained.

Although in the present embodiment, the recognition process for cells is described as a method of extracting a target region indicating a tracking object, the method of extracting a target region indicating a tracking object varies depending on a type of a tracking object or an image, and therefore, it is not particularly limited in the present invention.

After a recognition image of a cell region is obtained by such a recognition process, the feature-quantity calculating unit 101 obtains a feature quantity of each of the cell regions. The feature quantity is expressed by a numeric value or the like of at least one of a position, a size, a shape, a luminance, and a color of a cell region, and can be calculated using a general image processing method called blob analysis and the like.

Next, it is proceeded to a processing by the provisional tracking processing unit 102. First, the origin-image setting unit 201 sets the obtained cell image at each time as an origin image at the time of performing the provisional tracking on a cell region to be focused (step S4). Specifically, when i=0, each of the cell images at times t(0) to t(2) within the provisional tracking range is sequentially set as the origin image. Subsequently, the provisional ID assigning unit 202, the correspondence-index calculating unit 203, and the provisional ID propagating unit 204 perform the provisional tracking of a cell region based on each of the origin images sequentially set (step S5).

Figure 6:
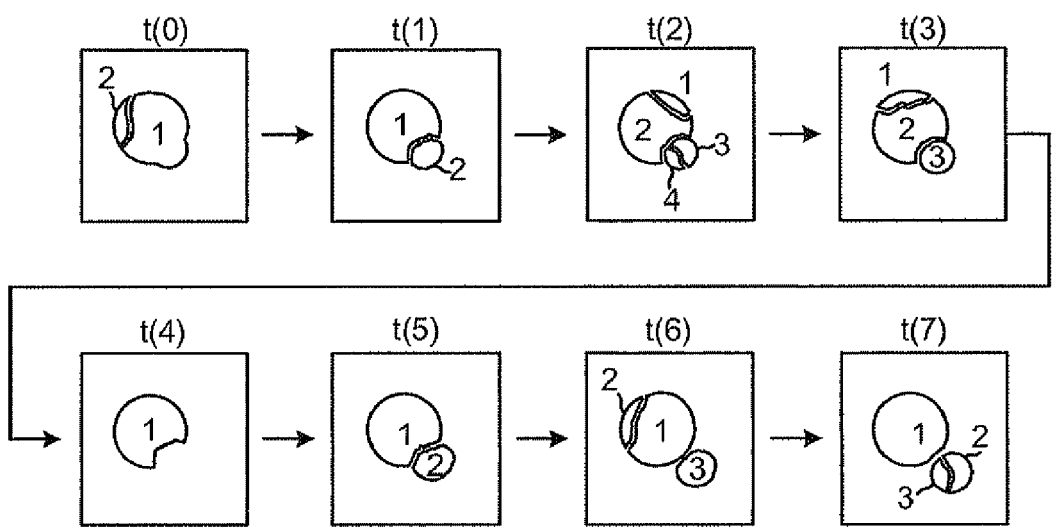
FIG. 6 is a schematic diagram showing one example of cell images that are obtained in a time series in a period from time t(0) to time t(7)

FIG. 6 is a schematic diagram showing one example of the cell images that are obtained in a time series, for example, in a period from time t(0) to time t(7). Explanation of the tracking process below is given with an example in which these cell images obtained in a time series are to be the subjects thereof. In FIG. 6, display based on a label value for each region such as that in FIG. 5B is not applied, and all recognized cell regions are simply expressed only with outlines so that it is easy to recognize each of the cell regions. Numerals (region No.) are serial numbers to identify each of the cell regions in the cell images of the respective times.

First, the provisional ID assigning unit 202 assigns a provisional ID to identify cell regions indicating an identical cell to each cell region in the origin image (step S501). The provisional IDs are assigned such that respective cell regions in the origin image have different provisional IDs. FIG. 7 is an explanatory diagram showing an example of assignment of the provisional ID when i=0 at the time of processing the images in a time series shown in FIG. 6, in other words, when each of the cell images at time t(0) to time t(2) shown in FIG. 6 is set as the origin image.

Next, the control unit 104 sets a code j to 1 (step S502), and it is determined whether a cell image at time t(s−j) positioned earlier than a tracking origin image (in this example, image at time t(s) for convenience) in a time series is a processing image at the provisional tracking. This process is performed by determining whether "s−j≧0? or s−j≧i−n" (step S503). With the former "s−j≧0?", whether a cell image to be a subject is present is determined, and with the latter "s−j≧i−n", whether a cell image to be a subject is within the time range at the time of performing the provisional tracking is determined.

When a result of determination at step S503 is positive (Yes), the correspondence-index calculating unit 203 calculates a correspondence index value between a cell region in a cell image at time t(s−j) and a cell region in each of cell images at times t(s−j+1) to t(s−j+N) (step S504). N is a value to determine a time range for cell images at the time of calculating the correspondence index value. When N=1, the correspondence index value is calculated only between cell regions in two pieces of cell images (in successive two frames) that are adjacent to each other in a time series, and when N=2, in addition to the above calculation, the correspondence index value is calculated also between cell regions in two pieces of cell images (in non-successive two frames) that are not adjacent to each other but have one piece of cell image therebetween. In other words, by calculating the correspondence index values between cell images having different time intervals, association of regions indicating the same cell is possible even in the case in which the region temporarily disappears due to a problem in the cell recognition process and is detected again. In the present embodiment, explanation is given supposing N=2. The correspondence index value is not calculated between images (determined with s−j+N≦s) sandwiching the tracking origin image.

The correspondence index value is an index for estimating whether cell regions R1 and R2 in different cell images are regions indicating the same cell. Specifically, there is a calculation method therefor using Equation (1) calculating from an overlapped area Area_OL of the cell regions R1 and R2 when two cell images respectively including the cell regions R1 and R2 are superimposed and areas Area_R1 and Area_R2 of R1 and R2, respectively. w represents a weighting coefficient, and it becomes w=0.5 when the correspondence index value of R2 to R1 and the correspondence index value of R1 to R2 are the same.

$$\text{correspondence index value} = \frac{\text{Area\_OL}}{w \times \text{Area\_R}_1 + (1-w) \times \text{Area\_R}_2} \quad (1)$$

Moreover, there is a method of calculating the correspondence index value as an inverse of a distance d of the cell regions R1 and R2 in a feature space that is defined by X pieces of feature quantities of the cell regions R1 and R2 calculated by the feature-quantity calculating unit 101, or a decreasing function using the distance d. As a calculation method of the distance d of the cell regions R1 and R2 in the feature space, a method of calculating a weighted city block distance shown in Equation (2), a method of calculating a weighted Eucledian distance shown in Equation (3), a method of calculating a Mahalanobis' generalized distance shown in Equation (4), and the like are included.

$$d = \sum_{l=1}^{x} w^l |R_1^l - R_2^l| \quad (2)$$

where $R_1^l$ represents a value of an $l^{th}$ feature quantity ($1 \leq l \leq X$) of $R_1$, and $w^l$ represents a weighting coefficient (set in advance) to the $l^{th}$ feature quantity.

$$d = \left\{ \sum_{l=1}^{x} w^l (R_1^l - R_2^l)^2 \right\}^{1/2} \quad (3)$$

where $R_1^l$ represents a value of the $l^{th}$ feature quantity ($1 \leq l \leq X$) of $R_1$, and $w^l$ represents the weighting coefficient (set in advance) to the $l^{th}$ feature quantity.

$$d = \left\{ \sum_{l=1}^{x} \sum_{m=1}^{x} (R_1^l - R_2^l) v_{lm} (R_1^m - R_2^m) \right\}^{1/2} \quad (4)$$

where $R_1^l$ represents a value of the $l^{th}$ feature quantity ($1 \leq l \leq X$) of $R_1$, $R_1^m$ represents a value of an $m^{th}$ feature quantity ($1 \leq m \leq X$) of $R_1$, and vim represents an (l, m) element in an inverse matrix $V^{-1}$ of a variance-covariance matrix V of a feature quantity of the entire cell region whose feature quantity is calculated. The distance d in Equation (4) is a distance in a space in which influence of variance in the distribution of the entire cell region is normalized.

Furthermore, such a coefficient is set that a value thereof decreases as cell images respectively including the cell regions R1 and R2 become away from each other in a time series, and a final correspondence index value can be obtained by multiplying the correspondence index value that is calculated by the two methods described above by this coefficient. For example, it is set such that between images adjacent to each other in a time series, coefficient=1, between images sandwiching one piece of image therebetween in a time series, coefficient=0.9, and the like.

As for the correspondence index value calculated by either of the two methods described above, the larger the value is, the higher the possibility of indicating the same cell is. For example, FIG. 8 is an explanatory diagram showing an example of a result of calculation of the correspondence index value when the cell image at time t(2) is set as the origin image and j=1, that is, the correspondence index value between a cell region in the image at time t(s−j)=t(2−1)=t(1), and a cell region in a cell image (the origin image) at time t(s−j+1)=t(2−1+1)=t(2) (=origin image). From this result, it can be estimated that there is a high possibility that a cell region of No. 1 in the cell image at time t(1) is a region indicating the same cell as that indicated by a cell region of No. 2 in the cell image at time t(2), and that there is a high possibility that a cell region of No. 2 in the cell image at time t(1) is a region indicating the same cell as that indicated by a cell region of No. 3 in the cell image at time t(2). It is assumed that there is no correspondence between cell regions when the correspondence index value is lower than a predetermined threshold, and such a case is not shown in the figure.

After the correspondence index value is calculated, the provisional ID propagating unit 204 propagates a provisional ID of a cell region having the highest correspondence index value to each cell region in an image at time t(s−j) (step S505). FIG. 9 is an explanatory diagram showing an example of propagation of the provisional ID to a cell region in the cell image when the image at time t(2) is set as the origin image and j=1, that is, at time t(s−j)=t(2−1)=t(1). According to the result shown in FIG. 8, the provisional ID of the region having the highest correspondence index value is propagated. Specifically, the provisional ID of the cell region of No. 2 in the cell image at time t(2) is propagated to the cell region of No. 1 in the cell image at time t(1), and the provisional ID of the cell region of No. 3 in the cell image at time t(2) is propagated to the cell region of No. 2 in the cell image at time t(1).

When there is no corresponding cell region for a cell region of a propagation destination of the provisional ID, the provisional ID assigning unit 202 assigns a new provisional ID to the cell region. In other words, cell regions whose correspondence index value is lower than the predetermined threshold are not associated with each other, thereby improving accuracy of the provisional tracking.

After the propagation of the provisional ID is finished, the control unit 104 sets the code j=j+1 (step S506), and performs the determination at step S503 again. By performing the processes at steps S503 to S506 described above for each of the different origin images, plural results of the provisional tracking toward earlier time in a time series from the origin image are obtained. Upon obtaining a negative (No) result in the determination at step S503, the provisional tracking process toward earlier time in a time series is ended.

When the provisional tracking process toward earlier time in a time series is finished, the control unit 104 again sets the code j=1 (step S507), and performs the provisional tracking toward later time in a time series this time. As procedures, first, it is determined whether an image at time t(s+j) positioned later in a time series than the tracking origin image (time t(s)) is a processing image at the provisional tracking. This process is performed by determining whether "s+j≦T? or s+j≦i+n" (step S508). With the former "s+j≦T?", whether a cell image to be a subject is present is determined, and with the latter "s+j≦i+n", whether a cell region image to be a subject is within the time range at the time of performing the provisional tracking is determined.

When a result of determination at step S508 is positive (Yes), the correspondence-index calculating unit 203 calculates the correspondence index value between a cell region in a cell image at time t(s+j) and a cell region in each of cell images at times t(s+j−N) to t(s+j−1) (step S509). The correspondence index value is not calculated between images (determined with s+j−N≧s) sandwiching the tracking origin image.

FIG. 10 is an explanatory diagram showing an example of a calculation result of the correspondence index value when the cell image at time t(0) is set as the origin image and j=1, that is, the correspondence index value between the cell region in the cell image at time t(s+j)=t(0+1)=t(1) and the cell region in the cell image at time t(s+j−1)=t(0+1−1)=t(0) (origin image). From this result, it can be estimated that there is a high possibility that a cell region of No. 1 in the cell image at time t(1) is a region indicating the same cell as that indicated by a cell region of No. 1 in a cell image at time t(0), and that there is a high possibility that a cell region of No. 2 in the cell image at time t(1) is also the region indicating the same cell as that indicated by the cell region of No. 1 in the cell image at time t(0). Similarly to the case shown in FIG. 8, it is assumed that there is no correspondence between cell regions when the correspondence index value is lower than a predetermined threshold, and such a case is not shown in the figure.

Figures 11, 12:
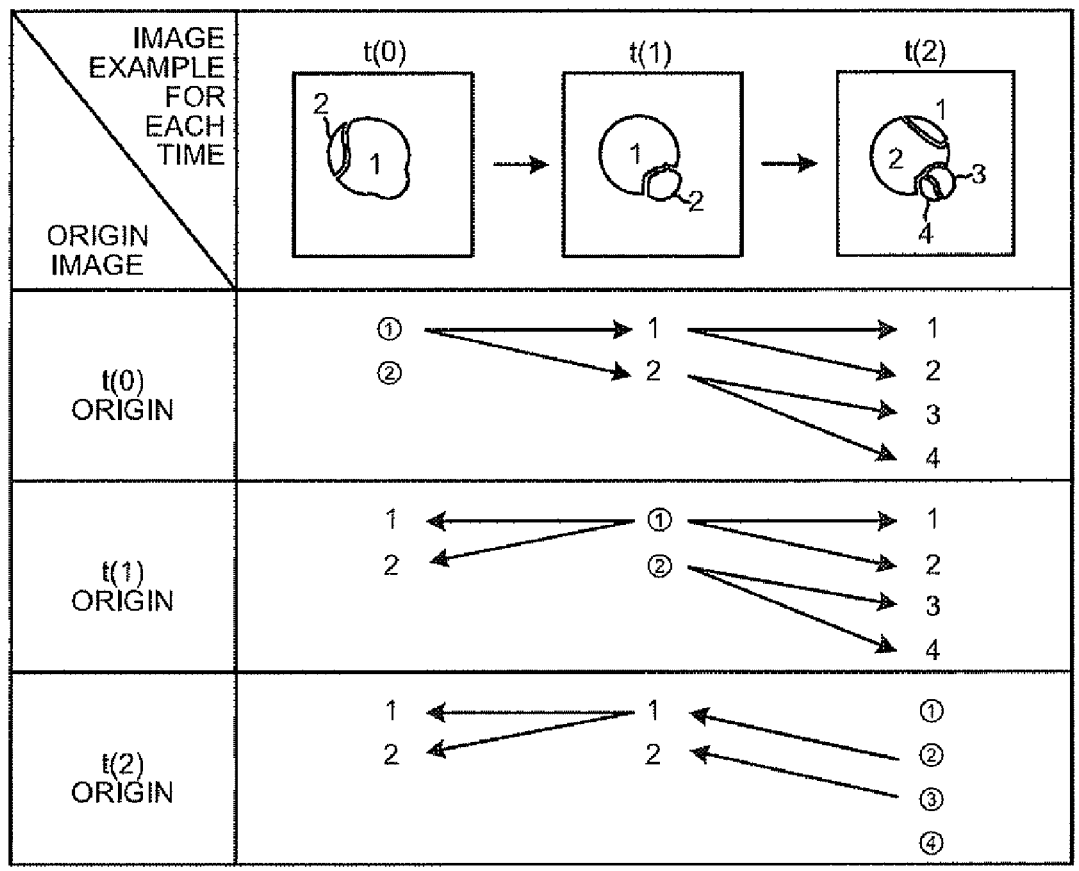
FIG. 11 is an explanatory diagram showing an example of propagation of the provisional ID to a cell region in the cell image at time t(1) when the cell image at time t(0) is set as the origin image.
FIG. 12 is an explanatory diagram schematically showing an example of a provisional tracking process in which link relation is set according to the correspondence index value for each cell region in each of origin images, setting cell images at respective times in the provisional tracking range when i=0 as the origin images.

After the correspondence index value is calculated, the provisional ID propagating unit 204 propagates a provisional ID of a cell region having the highest correspondence index value to each cell region in an image at time t(s+j) (step S510). FIG. 11 is an explanatory diagram showing an example of propagation of the provisional ID to a cell region in the cell image when the cell image at time t(0) is set as the origin image and j=1, that is, at time t(s+j)=t(0+1)=t(1). According to the result shown in FIG. 10, the provisional ID of the region having the highest correspondence index value is propagated. Specifically, the provisional ID of the cell region of No. 1 in the cell image at time t(0) is propagated to both the cell regions of No. 1 and No. 2 in the cell image at time t(1). When there is no corresponding cell region for a cell region of a propagation destination of the provisional ID, similarly to the case in the provisional tracking toward earlier time, the provisional ID assigning unit 202 assigns a new provisional ID to the cell region.

Since the provisional ID of a cell region having the highest correspondence index value is sequentially propagated in both the provisional tracking toward earlier time and the provisional tracking toward later time, accuracy of the provisional tracking is improved.

After the propagation of the provisional ID is finished, the control unit 104 sets code j=j+1 (step S511), and performs the determination at step S508 again. By performing the processes at steps S508 to S511 described above for each of the different origin images, plural results of the provisional tracking toward later time in a time series from the origin image are obtained. Upon obtaining a negative (No) result in the determination at step S508, the provisional tracking process is ended.

In other words, when i=0 to acquire a tracking result of the cell regions of No. 1 and 2 at time t(0) to be focused, the provisional tracking processing unit 102 sets each of the cell images at times t(0) to t(2) as the origin image, and performs such a processing, as the provisional tracking, that link relation as indicated by arrows toward earlier time and later time in a time series is set according to the highest correspondence index value for each cell region (region No. is circled in FIG. 12) in each of the origin images, as schematically shown in FIG. 12. In the present embodiment, accuracy of tracking is improved by using the link relation obtained by thus changing the origin images. FIG. 13 is an explanatory diagram showing the link relation between the cell regions shown in FIG. 12 in a form of a propagation table of the provisional ID.

After the provisional tracking process is finished, the final tracking processing unit 103 determines a final tracking result of each cell region in the cell image at time t(i) focused, based on the result of the provisional tracking (S6). Specifically, first, one of cell regions in the cell image at time t(i) is focused, and the number of cell regions in cell images at time t(i−n) to t(i) to which the same provisional ID as this cell region is counted. In this case, only when no cell region is present to which the same provisional ID as the focused cell region is assigned, the focused cell region itself is counted.

Detailed explanation is given referring to a provisional tracking result shown in FIG. 13. FIG. 13 illustrates a provisional tracking result when i=0 to acquire a tracking result of each cell region at time t(0). First, the cell region of No. 1 in the cell image at time t(i)=t(0) is determined as a region of interest. In images at time t(i−n) to t(i)=t(0−2), which is actually only the image at time t(0), when the image at time t(0) is set as the origin image, a cell region to which the same provisional ID as the region of interest is assigned is checked. As a result, there is no region to which the same provisional ID as the region of interest is assigned. Therefore, in this case, the region of interest itself is counted.

Next, a provisional tracking result when the image at time t(1) is set as the origin image shown in FIG. 13 is checked, and it is found that the same provisional ID as the region of interest is assigned to the cell region of No. 2 in the cell image at time t(0). Therefore, the cell region of No. 2 in the cell image at t(0) is counted. Finally, a provisional tracking result when the image at time t(2) is set as the origin image is checked, and it is found that the same provisional ID as the region of interest is assigned to the cell region of No. 2 in the cell image at time t(0), similarly to the above. Therefore, the cell region of No. 2 in the cell image at time t(0) is counted, and as a result, 2 is obtained. Thus, the provisional counting for the cell region of No. 1 in the cell image at time t(0) based on the provisional tracking result is finished.

Next, the region of interest is changed to the cell region of No. 2 in the cell image at time t(0) and the same processing is performed. FIG. 14 is an explanatory diagram showing a counting example of the provisional tracking result described above.

After the counting of the provisional tracking result is finished, based on the concept of majority decision, a final ID that is same as a cell region having the largest number is assigned to the region of interest. The final ID is an ID finally determined to identify a cell region that indicates an identical cell. In the case of the counting example shown in FIG. 14, to the cell regions of No. 1 and 2 in the cell image at time t(0), a final ID same as the other cell region is assigned, and in this case, the same final ID is assigned to these two cell regions.

Although the provisional tracking result toward later time in a time series setting the cell image at time t(0) as the origin image is not referred at this time at all, it is referred when the code i is carried forward and a final tracking result in a cell image at following time is calculated. In the explanation, to explain the provisional tracking result toward later time in a time series, an example in which it is calculated in advance is explained.

Figure 15:
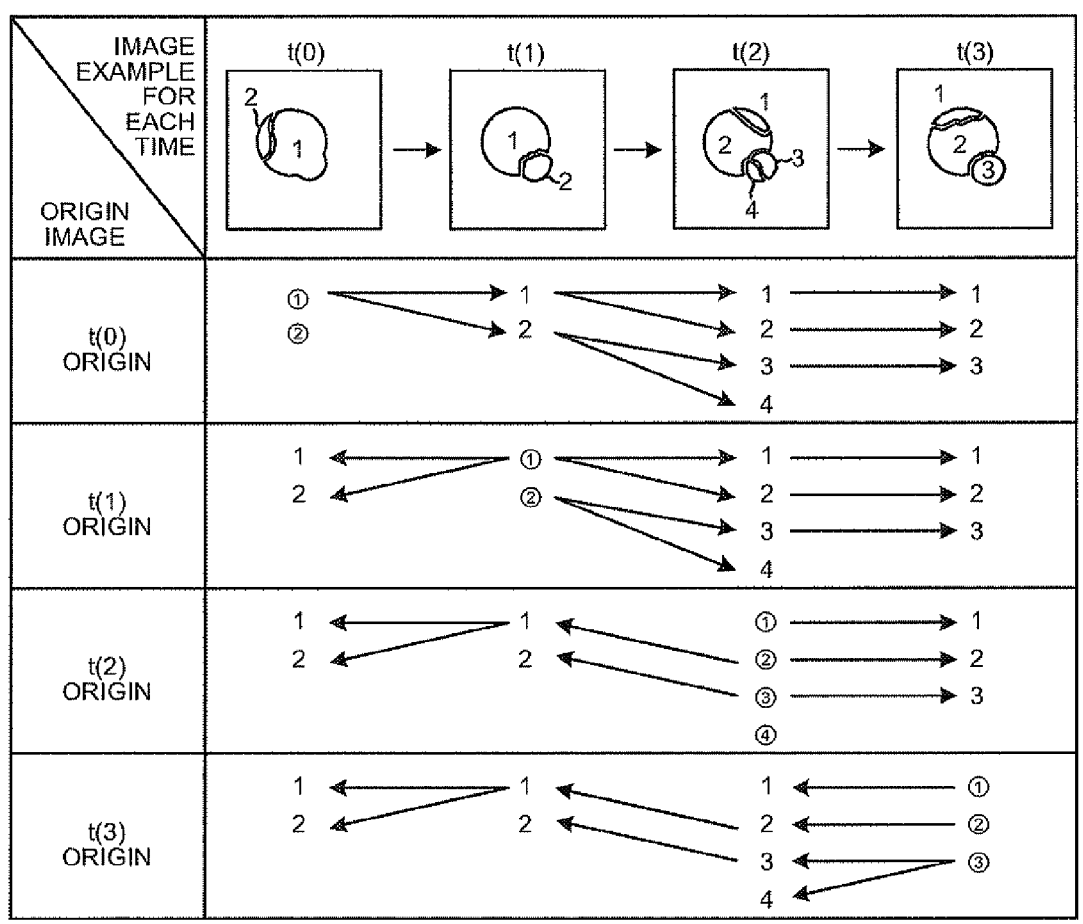
FIG. 15 is an explanatory diagram schematically showing an example of the provisional tracking process in which link relation is set according to the correspondence index value for each cell region in each of origin images, setting cell images at respective times in the provisional tracking range when i=1 as the origin images.

Next, a state when the code i is sequentially carried forward at step S7 is explained. FIG. 15 is a schematic diagram showing a processing example in which based on the case shown in FIG. 12, the cell images at time t(0) to t(3) are obtained when i=1 to acquire the tracking result of each cell region in the cell image at time t(1) to be focused, each of these cell images at times t(0) to t(3) are set as the origin image, and link relation as indicated by arrows toward earlier time and later time in a time series is set according to the highest correspondence index value for each cell region in each of the origin images.

FIG. 16 is an explanatory diagram showing the link relation between the cell regions shown in FIG. 15 in a form of a propagation table of the provisional ID.

Data newly added in FIG. 16 to the provisional tracking result shown in FIG. 13 is a result of propagation to each cell region at time t(3) and a result of propagation when the cell image at time t(3) is set as the origin image. In other words, when the code i is carried forward, the acquisition of a cell image, recognition of a cell region, calculation of a feature quantity, and provisional tracking of a cell region should be performed only for a part for which such processes are not performed in a previous processing. As for a part for which such processes have already been performed in a previous processing, it can be configured to store data thereof in a memory at the processing, and to use the data by reading therefrom when necessary.

FIG. 17 is an explanatory diagram showing a counting example of the provisional tracking result when i=1 (the provisional tracking result shown in FIG. 16). When the cell region of No. 1 in the cell image at time t(i)=t(1) is determined as the region of interest, the cell region of No. 1 at time t(0) has the same provisional ID four times when each of the images at times t(0) to t(3) shown in FIG. 16 is the origin image, the cell region of No. 2 at time t(0) has the same provisional ID three times when each of the images at times t(1) to t(3) shown in FIG. 16 is the origin image, and the cell region of No. 2 at time t(1) has the same provisional ID once when the image at time t(0) shown in FIG. 16 is the origin image.

Similarly, when the cell image of No. 2 in the cell image at time t(i)=t(1) is determined as the region of interest, the cell region of No. 1 at time t(0) has the same provisional ID once when the image at time t(0) shown in FIG. 16 is the origin image, the cell region of No. 1 at time t(1) has the same provisional ID once when the image at time t(0) shown in FIG. 16 is the origin image, and no cell region having the same provisional ID is present and the region of interest itself is counted three times when each of the images at times t(1) to t(3) shown in FIG. 16 is the origin image.

Figures 18, 19:
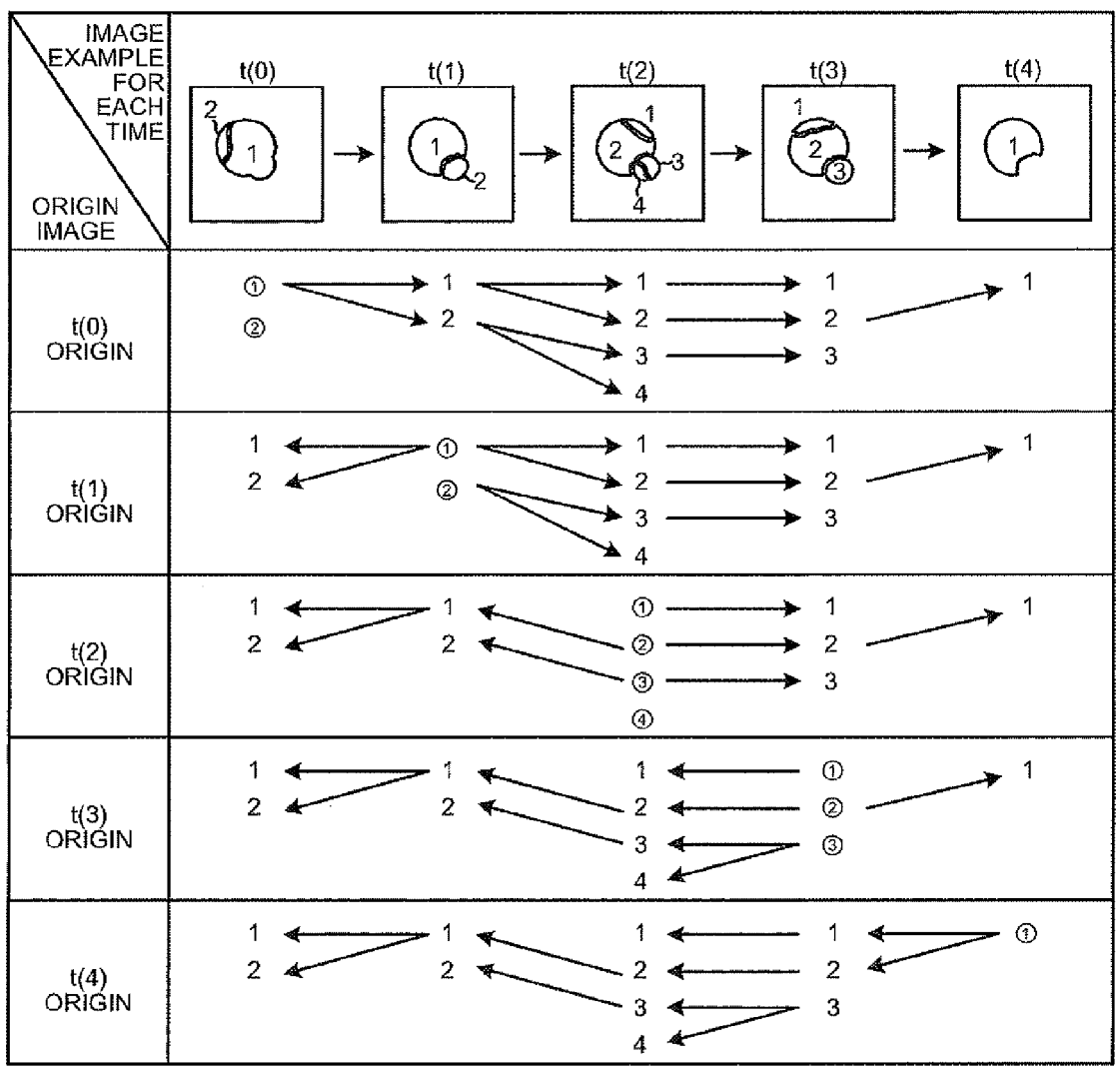
FIG. 18 is an explanatory diagram showing an example of assignment of a final ID based on the counting example shown in FIG. 14 and FIG. 17.
FIG. 19 is an explanatory diagram schematically showing an example of the provisional tracking process in which link relation is set according to the correspondence index value for each cell region in each of origin images, setting cell images at respective times in the provisional tracking range when i=2 as the origin images.

FIG. 18 is an explanatory diagram showing an example of assignment of the final ID based on the counting example shown in FIG. 14 and FIG. 17. From the counting result shown in FIG. 14, the same final ID (F_ID1) is assigned to the cell regions of No. 1 and 2 in the cell image at time t(0), and thereafter, from the counting result shown in FIG. 17, the final ID (F_ID1) same as that of the cell region of No. 1 at time t(0) is propagated to the cell region of No. 1 at time t(1) and a new final ID (F_ID2) is assigned to the cell region of No. 2 at time t(1).

Similarly, process examples when i=2, 4, and 5 are explained. First, FIG. 19 is a schematic diagram showing a process example in which based on the cases shown in FIGS. 12 and 15, cell images at times t(0) to t(4) are obtained when i=2 to acquire a tracking result of each cell region in the cell image at time t(2) to be focused, each of the cell images at times t(0) to t(4) is set as the origin image, and link relation as indicated by arrows toward earlier time and later time in a time series is set according to the highest correspondence index value for each cell region in each of the origin images. FIG. 20 is an explanatory diagram showing the link relation between the cell regions shown in FIG. 19 in a form of a propagation table of the provisional ID, FIG. 21 is an explanatory diagram showing an example of a counting result of the provisional tracking result shown in FIG. 20, and FIG. 22 is an explanatory diagram showing an example of assignment of a final ID based on FIG. 21.

If the count values are the same value in the counting result, among cell regions to which the final ID has already been assigned, the final ID is propagated from the one closer in a time series. Therefore, to the cell region of No. 1 at time t(2), from the cell region of No. 1 at time t(1); to the cell region of No. 3 at time t(2), from the cell region of No. 2 at time t(1); and to the cell region of No. 4 at time t(2), from the cell region of No. 2 at time t(1), the final ID is respectively propagated.

Figure 23:
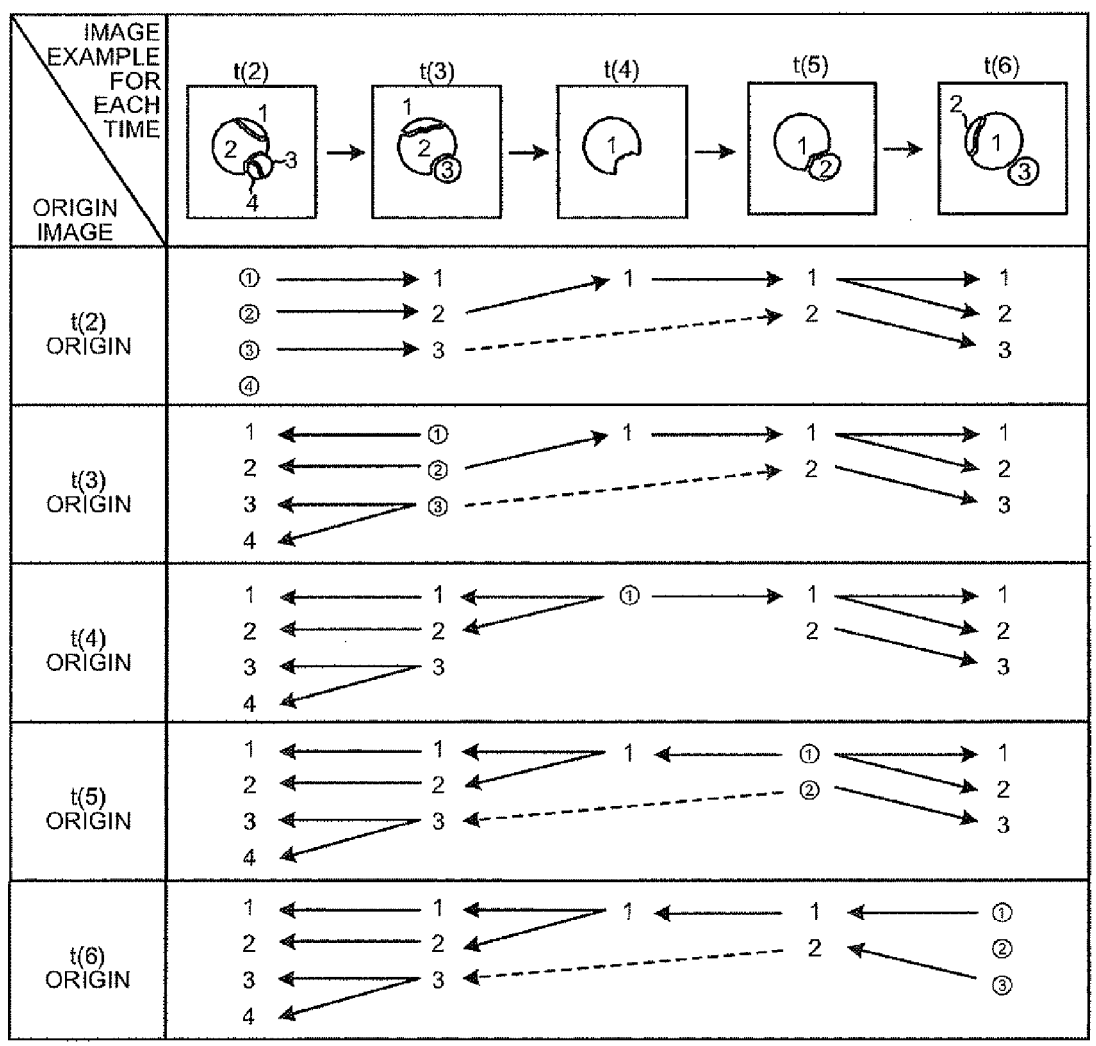
FIG. 23 is an explanatory diagram schematically showing an example of the provisional tracking process in which link relation is set according to the correspondence index value for each cell region in each of origin images, setting cell images at respective times in the provisional tracking range when i=4 as the origin images.

Next, FIG. 23 is a schematic diagram showing a process example in which based on the cases shown in FIGS. 12, 15, and 19, cell images at times t(2) to t(6) are obtained when i=4 to acquire a tracking result of each cell region in the cell image at time t(4) to be focused, each of the cell images at times t(2) to t(6) is set as the origin image, and link relation as indicated by arrows toward earlier time and later time in a time series is set according to the highest correspondence index value for each cell region in each of the origin images. FIG. 24 is an explanatory diagram showing the link relation between the cell regions shown in FIG. 23 in a form of a propagation table of the provisional ID. In this case, although tracking relation is temporarily lost in the cell image at time t(4) for the cell region of No. 3 at time t(3) and the cell region of No. 2 at time t(5), since the correspondence index value is calculated also between the cell images at times t(3) and t(5) at the time of calculating the correspondence index value and is used for the provisional tracking, the correspondence is maintained between the cell region of No. 3 at time t(3) and the cell region of No. 2 at time t(5) by propagating and assigning the same provisional ID.

Figure 25:
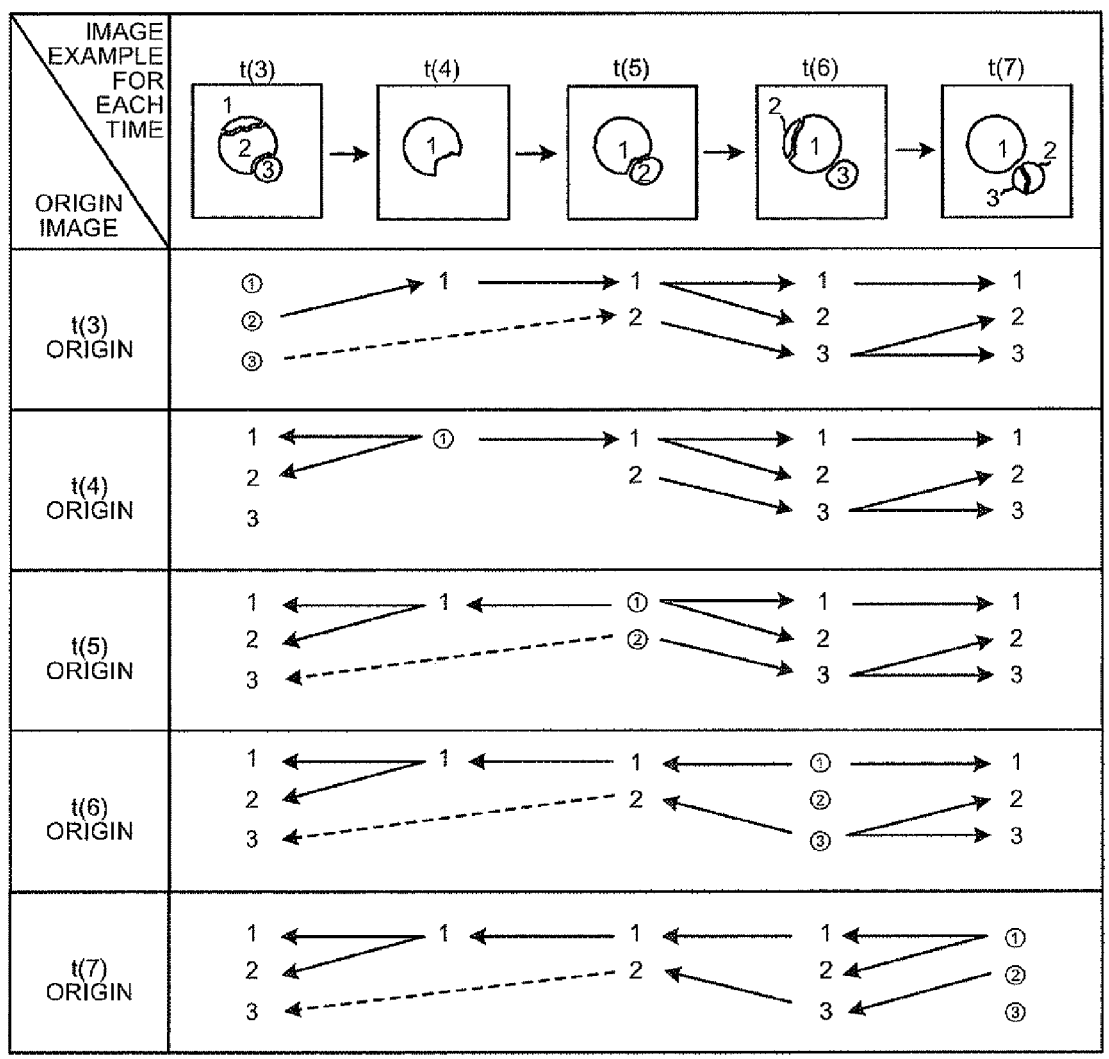
FIG. 25 is an explanatory diagram schematically showing an example of the provisional tracking process in which link relation is set according to the correspondence index value for each cell region in each of origin images, setting cell images at respective times in the provisional tracking range when i=5 as the origin images.

Furthermore, FIG. 25 is a schematic diagram showing a process example in which based on the cases shown in FIGS. 12, 15, 19, and 23, cell images at times t(3) to t(7) are obtained when i=5 to acquire a tracking result of each cell region in the cell image at time t(5) to be focused, each of the cell images at times t(3) to t(7) is set as the origin image, and link relation as indicated by arrows toward earlier time and later time in a time series is set according to the highest correspondence index value for each cell region in each of the origin images. FIG. 26 is an explanatory diagram showing the link relation between the cell regions shown in FIG. 25 in a form of a propagation table of the provisional ID, and FIG. 27 is an explanatory diagram showing an example of assignment of a final ID based on the counting result of the provisional tracking result shown in FIG. 26. As a result, although tracking relation is temporarily lost in the cell image at time t(4) for the cell region of No. 3 at time t(3), as described above, since the correspondence index value is calculated also between the cell images at times t(3) and t(5) and is used for the provisional tracking, the same final ID (F_ID2) is assigned to the cell region of No. 2 at time t(5).

As described above, by using several pieces of cell images of earlier time and later time in a time series, by counting a plurality of provisional tracking results in cases in which the origin image is varied, and by using the provisional tracking result having the highest frequency as the tracking result based on the concept of majority decision, a final tracking result that is further chronologically consistent can be obtained in each cell image even in an instable state in which erroneous detection of a cell region occurs randomly and credibility of a result of detection is insufficient.

while in the present embodiment, it is configured to count the number of respective cell regions having the same provisional ID for region of interests in cell regions, and to propagate a final ID of a cell region having a large count value, it can be configured to add a point to each of the cell regions having the same provisional ID according to a predetermined rule, and to propagate a final ID of a cell region having the most points.

As the predetermined rule, for example, followings can be listed as examples.

A. Compared to a point given to a provisional tracking result obtained when a cell image positioned earlier in a time series than an image at time t(i) including a region of interest is the origin image, a higher point is given to a provisional tracking result obtained when a cell image positioned later in a time series than the cell image at time t(i) is the origin image.

B. A lower point is given to a cell region in a cell image, as the cell image becomes apart in a time series from the image at time t(i) including the region of interest.

C. A point corresponding to the correspondence index value with respect to the region of interest is given.

Moreover, while in the present embodiment, the provisional tracking is performed using the same number of pieces (two pieces each) of cell images for each of earlier time and later time in a time series relative to the cell image at time t(i) including the region of interest, the provisional tracking can be performed setting a range of cell images to the different number of pieces for earlier time and for later time.

After the final tracking result is determined for one region of interest, the control unit 104 sets the code i=i+1 (step S7), and determines whether a cell image to be a subject of processing is present based on t(i)≦t(T) (step S8). When a result of determination is t(i)≦t(T) and a cell image to be a subject of processing is still present (step S8: Yes), the processes at steps S2 to S7 described above are repeated in a similar manner. On the other hand, when a result of determination is t(i)>t(T) and no cell image to be a subject of processing is present (step S8: No), the final tracking result is output (step S9), and a cell-region tracking process by the image processing apparatus 100 is ended.

FIG. 28 is a schematic diagram showing an example of a result of tracking of a cell region in cell images in a time series shown in FIG. 6. In FIG. 28, correspondence is expressed by performing the same hatching process or the filling process with various colors on cell regions to which the same final ID is assigned (distinguished by colors in an actual image display example). From FIG. 28, it can be seen that tracking is performed as an identical cell region for regions that have high possibility of being generated as a result of erroneous recognition and that are divided by an chronologically unstable dividing line and for a region that temporarily disappears, and that the tracking is performed as different cell regions for regions that are divided by a chronologically stable dividing line.

The present invention is not limited to the embodiment described above, and various modifications can be made without departing from the scope of the gist of the present invention. For example, the processes performed by respective components of the feature-quantity calculating unit 101, the provisional tracking processing unit 102, the final tracking processing unit 103, and the like can be implemented using a computer such as a personal computer to execute the target-region tracking program that is prepared in advance. This target-region tracking program can be distributed through a network such as the Internet. Furthermore, this target-region tracking program can be recorded on a computer-readable recording medium such as a hard disk, an FD, a CD-ROM, an MO, and a DVD, to be executed by a computer reading from the recording medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a control unit configured with a microcomputer, the control unit includes:
a feature-quantity calculating unit that calculates feature quantities of target regions each indicating a tracking object in respective target images, the target images being obtained by capturing the tracking object at a plurality of time points;
a provisional-tracking processing unit that performs provisional tracking of the target region by associating the target regions of the target images with each other using the calculated feature quantities; and
a final-tracking processing unit that acquires a final tracking result of the target region based on a result of the provisional tracking, wherein
the provisional-tracking processing unit includes an origin-image setting unit that sets the target images at a plurality of time points within a time range for which the provisional tracking is performed as origin images each being an origin of the provisional tracking, and the provisional-tracking processing unit performs the provisional tracking for each of the origin images that are set by the origin-image setting unit, and
the final-tracking processing unit acquires the final tracking result of the target region by totaling a plurality of results of the provisional tracking performed for the respective origin images.

2. The image processing apparatus according to claim 1, wherein the provisional-tracking processing unit performs the provisional tracking toward earlier time and later time in a time series.

3. The image processing apparatus according to claim 1, wherein the provisional-tracking processing unit performs the provisional tracking by associating the target regions of the target images having different time intervals with each other.

4. The image processing apparatus according to claim 1, wherein the provisional-tracking processing unit includes
a provisional ID assigning unit that assigns a provisional ID for identifying the target region, to each of the target regions in the target images;
a correspondence-index calculating unit that calculates a correspondence index value that indicates a degree of correspondence of the target regions of the target images at different time points; and
a provisional ID propagating unit that associates the target regions of the target images with each other by sequentially propagating a provisional ID of the target region, the correspondence index value of which is highest, to the target region in the target image at a time point earlier or later in a time series from the target region in the origin image.

5. The image processing apparatus according to claim 4, wherein the provisional ID assigning unit assigns, when the provisional ID propagating unit determines that the target images have no target region, the correspondence index value of which is higher than a predetermined threshold, a new provisional ID to the target region.

6. The image processing apparatus according to claim 4, wherein the correspondence index value is a value calculated based on a distance between the target regions in a feature space that is defined by at least one of feature quantities of a position, a size, a shape, a luminance, and a color of the target region.

7. The image processing apparatus according to claim 4, wherein the correspondence index value is a value that is obtained by normalizing an area in which the target regions are overlapped with each other by a sum of areas of the target regions.

8. The image processing apparatus according to claim 1, wherein the feature quantity includes a feature quantity of at least one of a position, a size, a shape, a luminance, and a color of the target region.

9. The image processing apparatus according to claim 1, wherein the target region indicating the tracking object is a region indicating a cell.

10. A non-transitory computer program medium having stored thereon programmed instructions for tracking a target area indicating a tracking object present in target images obtained by capturing a tracking object at a plurality of time points in a time series, wherein the instructions, when executed by a computer, cause the computer to perform:
calculating feature quantities of target regions each indicating a tracking object in respective target images, the target images being obtained by capturing the tracking object at a plurality of time points;
performing provisional tracking of the target region by associating the target regions of the target images with each other using the calculated feature quantities; and
acquiring a final tracking result of the target region based on a result of the provisional tracking, wherein
the instructions further causing the computer to perform setting the target images at a plurality of time points within a time range for which the provisional tracking is performed, as origin images each being an origin of the provisional tracking,
the provisional-tracking is performed for each of the origin images that are set at the setting the target images, and
the acquiring the final tracking result includes acquiring the final tracking result of the target region by totaling a plurality of results of the provisional tracking performed for the respective origin images.

11. The medium according to claim 10, wherein the provisional-tracking is performed toward earlier time and later time in a time series.

12. The medium according to claim 10, wherein the provisional-tracking is performed by associating the target regions of the target images having different time intervals with each other.

13. The medium according to claim 10, wherein the instructions further causing the computer to perform:
assigning a provisional ID for identifying the target region, to each of the target regions in the target images;
calculating a correspondence index value that indicates a degree of correspondence of the target regions of the target images at different time points; and
associating the target regions of the target images with each other by sequentially propagating a provisional ID of the target region, the correspondence index value of which is highest, to the target region in the target image at a time point earlier or later in a time series from the target region in the origin image.

14. The medium according to claim 13, wherein the assigning the provisional ID includes assigning, when it is determined that the target images have no target region, the correspondence index value of which is higher than a predetermined threshold, a new provisional ID to the target region.

15. The medium according to claim 13, wherein the correspondence index value is a value calculated based on a distance between the target regions in a feature space that is defined by at least one of feature quantities of a position, a size, a shape, a luminance, and a color of the target region.

16. The medium according to claim 13, wherein the correspondence index value is a value that is obtained by normalizing an area in which the target regions are overlapped with each other by a sum of areas of the target regions.

17. The medium according to claim 10, wherein the feature quantity includes a feature quantity of at least one of a position, a size, a shape, a luminance, and a color of the target region.

18. The medium according to claim 10, wherein the target region indicating the tracking object is a region indicating a cell.

* * * * *